US008033119B2

(12) United States Patent
Liang

(10) Patent No.: US 8,033,119 B2
(45) Date of Patent: Oct. 11, 2011

(54) GAS TURBINE TRANSITION DUCT

(75) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 488 days.

(21) Appl. No.: 12/338,401

(22) Filed: Dec. 18, 2008

(65) Prior Publication Data

US 2010/0071382 A1 Mar. 25, 2010

Related U.S. Application Data

(60) Provisional application No. 61/100,097, filed on Sep. 25, 2008.

(51) Int. Cl.
*F02C 1/00* (2006.01)

(52) U.S. Cl. .......................................... 60/806; 60/752

(58) Field of Classification Search ............ 60/752–760, 60/806; 415/116, 173.4, 173.5, 174.4, 200, 415/213.1

See application file for complete search history.

(56) References Cited

U.S. PATENT DOCUMENTS

| | | | | |
|---|---|---|---|---|
| 3,652,181 | A | 3/1972 | Wilhelm, Jr. | |
| 3,793,827 | A * | 2/1974 | Ekstedt | 60/757 |
| 4,526,226 | A * | 7/1985 | Hsia et al. | 165/109.1 |
| 4,719,748 | A | 1/1988 | Davis, Jr. et al. | |
| 4,790,140 | A | 12/1988 | Sato et al. | |
| 4,903,477 | A | 2/1990 | Butt | |
| 5,237,813 | A | 8/1993 | Harris et al. | |
| 5,528,904 | A * | 6/1996 | Jones et al. | 60/753 |
| 6,018,950 | A * | 2/2000 | Moeller | 60/752 |
| 6,282,905 | B1 | 9/2001 | Sato et al. | |
| 6,412,268 | B1 | 7/2002 | Cromer et al. | |
| 6,553,766 | B2 | 4/2003 | Shimizu et al. | |
| 6,568,187 | B1 | 5/2003 | Jorgensen et al. | |
| 6,640,547 | B2 | 11/2003 | Leahy, Jr. | |
| 7,010,921 | B2 | 3/2006 | Intile et al. | |
| 7,137,241 | B2 | 11/2006 | Martling et al. | |
| 7,278,254 | B2 | 10/2007 | Youngblood | |
| 7,310,938 | B2 | 12/2007 | Marcum et al. | |
| 7,340,881 | B2 | 3/2008 | Koganezawa et al. | |
| 7,827,801 | B2 * | 11/2010 | Dawson et al. | 60/759 |
| 2007/0175220 | A1 | 8/2007 | Bland | |

* cited by examiner

*Primary Examiner* — Louis Casaregola
*Assistant Examiner* — Phutthiwat Wongwian

(57) ABSTRACT

A transition member between a combustion section and a turbine section in a gas turbine engine. The transition member includes a casing inner wall and a plurality of spanning members. The spanning members extend radially outwardly from a radially outer surface of the casing inner wall. Each of the spanning members included a slot formed therein. Each slot is in communication with a first aperture formed in the radially inner surface of the casing inner wall and a plurality of second apertures formed in an aft side of the spanning member for effecting a passage of the cooling fluid from a first cooling fluid channel to an inner volume defined within the radially inner surface of the casing inner wall. The slots include a component in the radial direction and a component in the axial direction such that the first aperture is not radially aligned with the second apertures.

19 Claims, 5 Drawing Sheets

GAS TURBINE TRANSITION DUCT

CROSS-REFERENCE TO RELATED APPLICATION

This application claims the benefit of U.S. Provisional Application Ser. No. 61/100,097 entitled COOLING SYSTEM FOR A TRANSITION DUCT AND RELATED METHOD, filed Sep. 25, 2008, the entire disclosure of which is incorporated by reference herein.

FIELD OF THE INVENTION

The present invention relates to gas turbine engines and, more particularly, to a transition duct and a cooling thereof, wherein the transition duct conveys hot combustion gases from a combustion section of the engine to a turbine section.

BACKGROUND OF THE INVENTION

Generally, gas turbine engines have three main sections or assemblies, including a compressor assembly, a combustor assembly, and a turbine assembly. In operation, the compressor assembly compresses ambient air. The compressed air is channeled into the combustor assembly where it is mixed with a fuel and ignites, creating a working combustion gas. The combustion gas is expanded through the turbine assembly. The turbine assembly generally includes a rotating assembly comprising a centrally located rotating shaft and a plurality of rows of rotating blades attached thereto. A plurality of stationary vane assemblies, each including a plurality of stationary vanes, are connected to a casing of the turbine assembly and are located interposed between the rows of rotating blades. The expansion of the combustion gas through the rows of rotating blades and stationary vanes in the turbine assembly results in a transfer of energy from the combustion gas to the rotating assembly, causing rotation of the shaft. The shaft further supports rotating compressor blades in the compressor assembly, such that a portion of the output power from the rotation of the shaft is used to rotate the compressor blades to provide compressed air to the combustor assembly.

A transition duct is typically used as a conduit for the passage of the combustion gas from the combustor assembly to the turbine assembly. The transition duct may be comprised, for example, of a forward cone section and an intermediate exit piece. The forward cone section may include a generally circular forward end that receives the combustion gas from a basket member of the combustor section. The forward cone section may converge into a generally circular aft end that is associated with a generally circular forward end of the intermediate exit piece. An aft end of the intermediate exit piece may include a generally rectangular shape and delivers the combustion gas to the turbine section.

Due to the high temperature of the combustion gas that flows through the transition duct, the transition duct is typically cooled during operation of the engine to reduce the temperatures of the materials forming the forward cone section and the intermediate exit piece. Such cooling is typically required, as the materials forming the forward cone section and the intermediate exit piece, if not cooled, may become overheated, which may cause undesirable consequences, such as deterioration of the transition duct.

Prior art solutions for cooling the transition duct include supplying a cooling fluid, such as air that is bled off from the compressor section, onto an outer surface of the transition duct to provide direct convection cooling to the transition duct. An impingement member or impingement sleeve may be provided about the outer surface of the transition duct, wherein the cooling fluid may flow through small holes formed in the impingement member before being introduced onto the outer surface of the transition duct. Other prior art solutions inject a small amount of cooling fluid along an inner surface of the transition duct. The small amount of cooling fluid acts as a cooling film to cool the inner surface of the transition duct. The cooling film is gradually heated up by the combustion gas, wherein the cooling film is mixed in with the combustion gas and is transferred into the turbine section along with the combustion gas.

SUMMARY OF THE INVENTION

In accordance with a first aspect of the present invention, a transition member is provided between a combustion section and a turbine section in a gas turbine engine. The transition member comprises a casing inner wall, an impingement member, and a plurality of spanning members. The casing inner wall has a forward end defining a combustion gas inlet and an aft end axially spaced from the forward end and defining a combustion gas outlet. The casing inner wall includes a radially inner surface and an opposed radially outer surface. The radially inner surface defines an inner volume of the transition member therein. The impingement member is disposed radially outwardly about the casing inner wall and is spaced from the casing inner wall such that a first cooling fluid channel is formed between the impingement member and the casing inner wall. The impingement member includes a plurality of apertures formed therein for effecting a passage of cooling fluid from an area radially outward of the impingement member to the first cooling fluid channel. The spanning members extend from the radially outer surface of the casing inner wall to the impingement member. The spanning members each include a slot formed therein having a component in the radial direction. The slot is in communication with a first aperture formed in the radially inner surface of the inner wall and at least one second aperture formed in the spanning member for effecting a passage of the cooling fluid from the first cooling fluid channel to the inner volume defined within the radially inner surface of the casing inner wall.

In accordance with a second aspect of the present invention, a transition member is provided between a combustion section and a turbine section in a gas turbine engine. The transition member comprises a casing inner wall and a plurality of circumferentially elongate spanning members. The casing inner wall has a forward end defining a combustion gas inlet and an aft end axially spaced from the forward end and defining a combustion gas outlet. The casing inner wall includes a radially inner surface and an opposed radially outer surface. The radially inner surface defines an inner volume of the transition member therein and the radially outer surface is in communication with a first cooling fluid channel containing cooling fluid. The spanning members extend radially outwardly from the radially outer surface of the casing inner wall. Each of the spanning members includes a slot formed therein. Each slot is in communication with a first aperture formed in the radially inner surface of the casing inner wall and a plurality of second apertures formed in the spanning member for effecting a passage of the cooling fluid from the first cooling fluid channel to the inner volume defined within the radially inner surface of the casing inner wall. The slots each include a component in the radial direction and a component in the axial direction such that the first aperture is not radially aligned with the second apertures.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
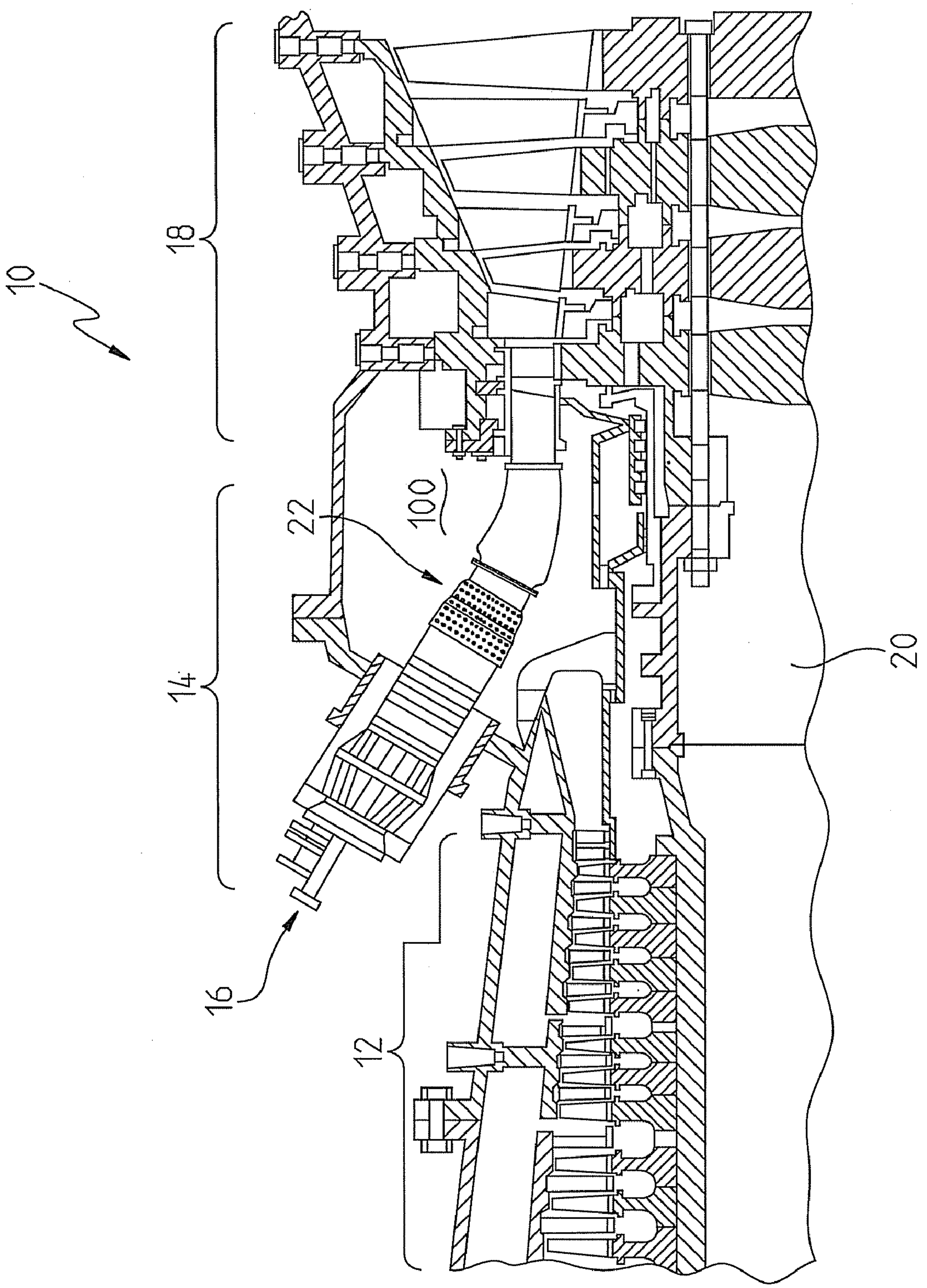
FIG. 1 is a sectional view of a portion of a gas turbine engine including a transition member according to an embodiment of the invention.

Referring to FIG. 1, a portion of a gas turbine engine 10 is shown. The engine 10 includes a compressor section 12, a combustion section 14 including a plurality of combustors 16 (only one shown), and a turbine section 18. The compressor section 12 inducts and pressurizes inlet air which is directed to the combustors 16 in the combustion section 14. Upon entering the combustors 16, the compressed air from the compressor section 12 is mixed with a fuel and ignited produce a high temperature and high velocity combustion gas flowing in a turbulent manner. The combustion gas then flows to the turbine section 18 where the combustion gas is expanded to provide rotation of a turbine rotor 20. A transition member 22 comprising a transition duct is used to transfer the combustion gas from the combustor section 14 to the turbine section 18.

Figure 2:
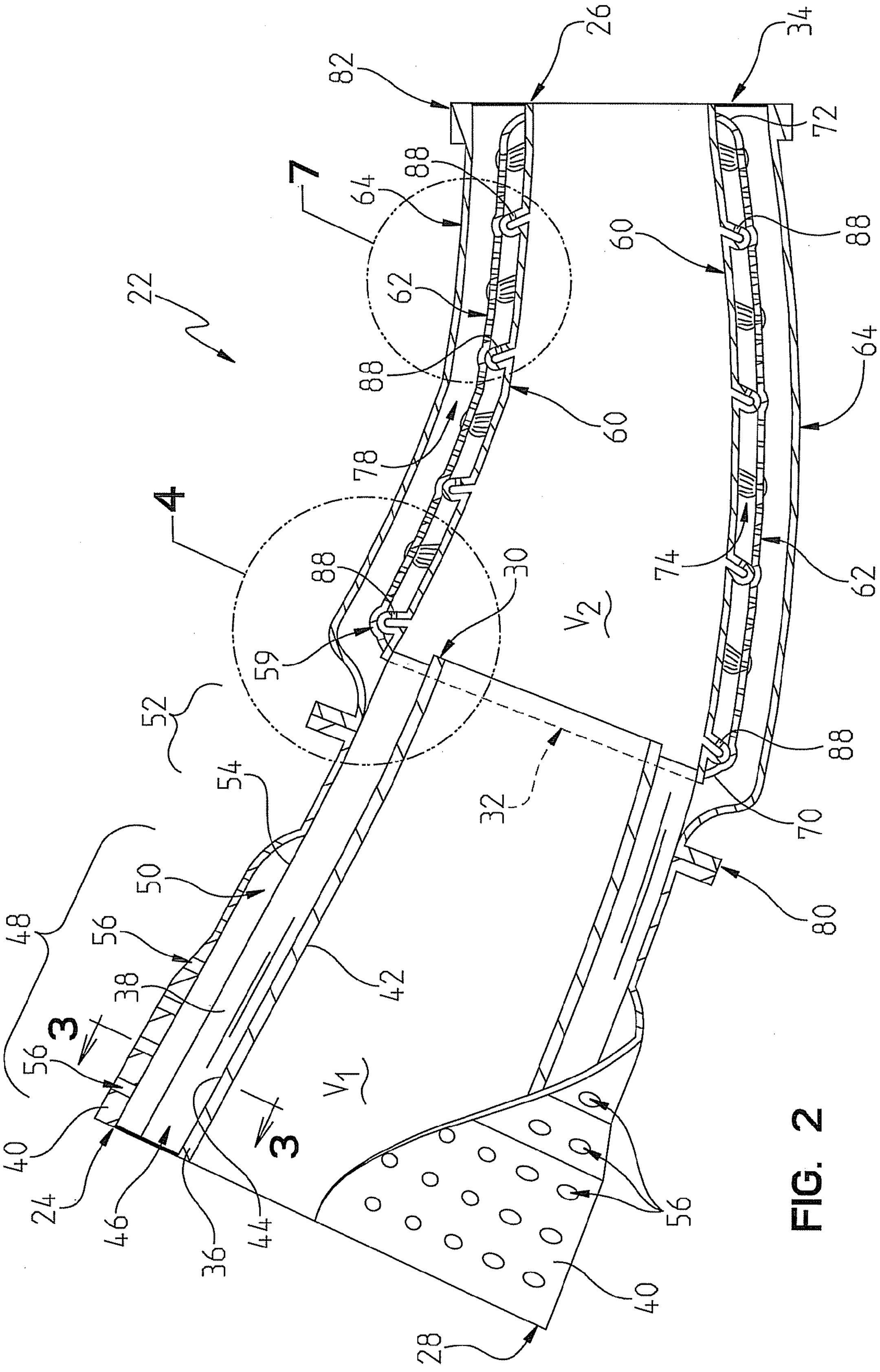
FIG. 2 is an enlarged side cross sectional view of the transition member illustrated in FIG. 1.
Figure 5:
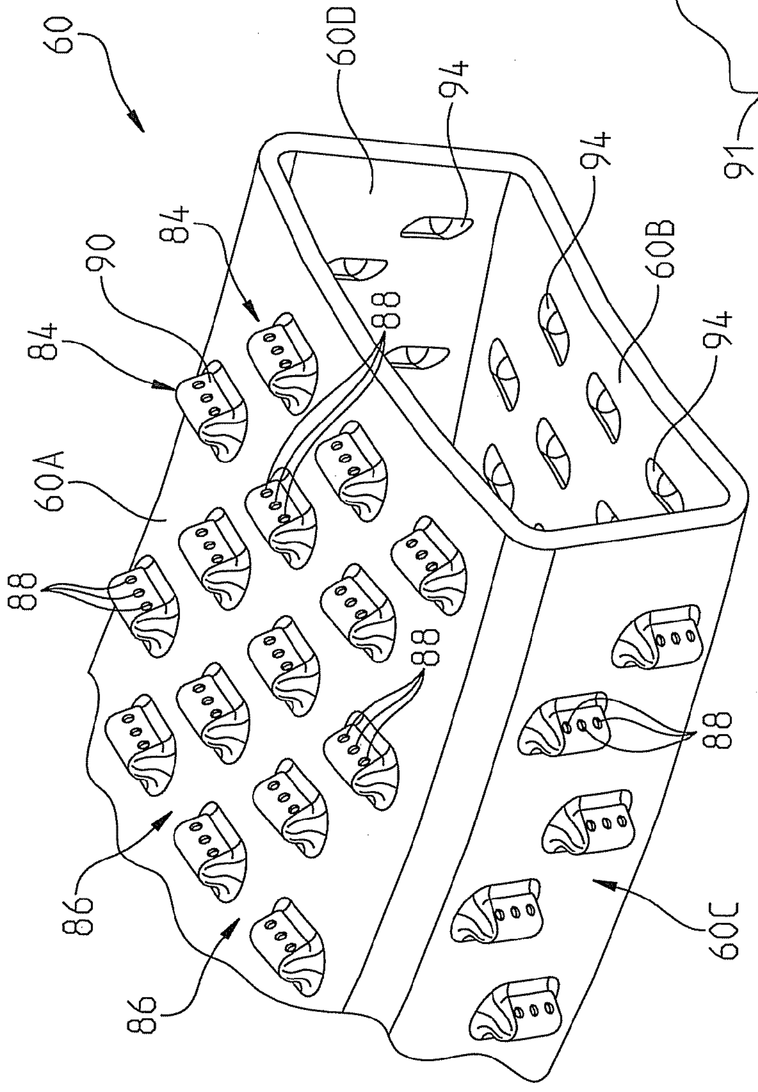
FIG. 5 is a perspective view of a portion of a casing inner wall of the second section of the transition member.

Referring to FIG. 2, the transition member 22 includes a forward cone shaped section defining a first section 24 and an intermediate exit piece (IEP) defining a second section 26 disposed downstream from the first section 24. The first section 24 comprises a forward end portion 28 forming a combustion gas inlet for receiving hot combustion gases from the combustor section 14. The first section 24 also includes an aft end portion 30 that is axially spaced apart from the forward end portion 28. The aft end portion 30 is associated with a forward end portion 32 of the second section 26, which forward end portion 32 defines a combustion gas inlet for receiving hot combustion gases from the first section 24. An aft end portion 34 of the second section 26 defines a combustion gas outlet of the transition member 22 and delivers the combustion gas to the turbine section 18. In the embodiment shown, the forward end portion 28 of the first section 24 comprises a generally circular shape and the aft end portion 30 of the first section 24 converges into a generally circular shape and corresponds with a generally circular shape of the forward end portion 32 of the second section 26. The aft end portion 34 of the second section 26 also comprises a generally rectangular shape, as shown in FIG. 5.

The first section 24 comprises a wall member 36, which includes an associated plurality of fins 38, and an external sleeve 40, as shown in FIG. 2. The wall member 36 includes a radially inner surface 42 and an opposed radially outer surface 44. The radially inner surface 42 defines an inner volume $V_1$ of the first section 24 for the flow of the combustion gas, as shown in FIG. 2. The wall member 36 is formed from a high heat tolerant material, such as, for example, an INCONEL alloy (INCONEL is a registered trademark of Special Metals Corporation), although any suitable high heat tolerant material may be used to form the wall member 36. The wall member 24 may comprise a single, unitary piece of material or may be formed from a plurality of pieces of material that are joined together using any suitable method, such as, for example, by bolting or welding. In the embodiment shown in FIG. 2, the wall member 36 extends from the forward end portion 28 of the first section 24 to the aft end portion 30 of the first section 24.

Figure 3:
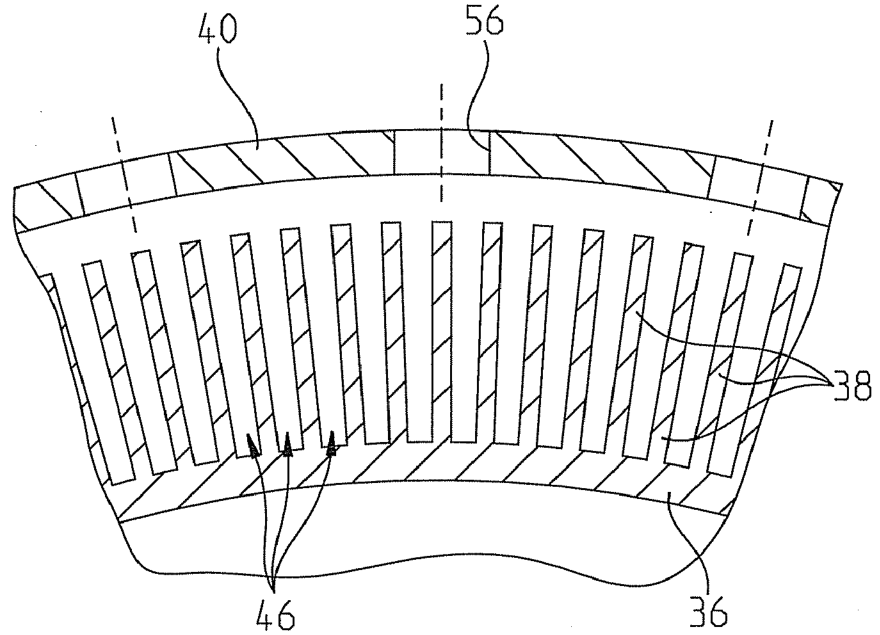
FIG. 3 is a cross sectional view of a portion of a forward end of the transition member taken along line 3-3 in FIG. 2.
Figure 4:
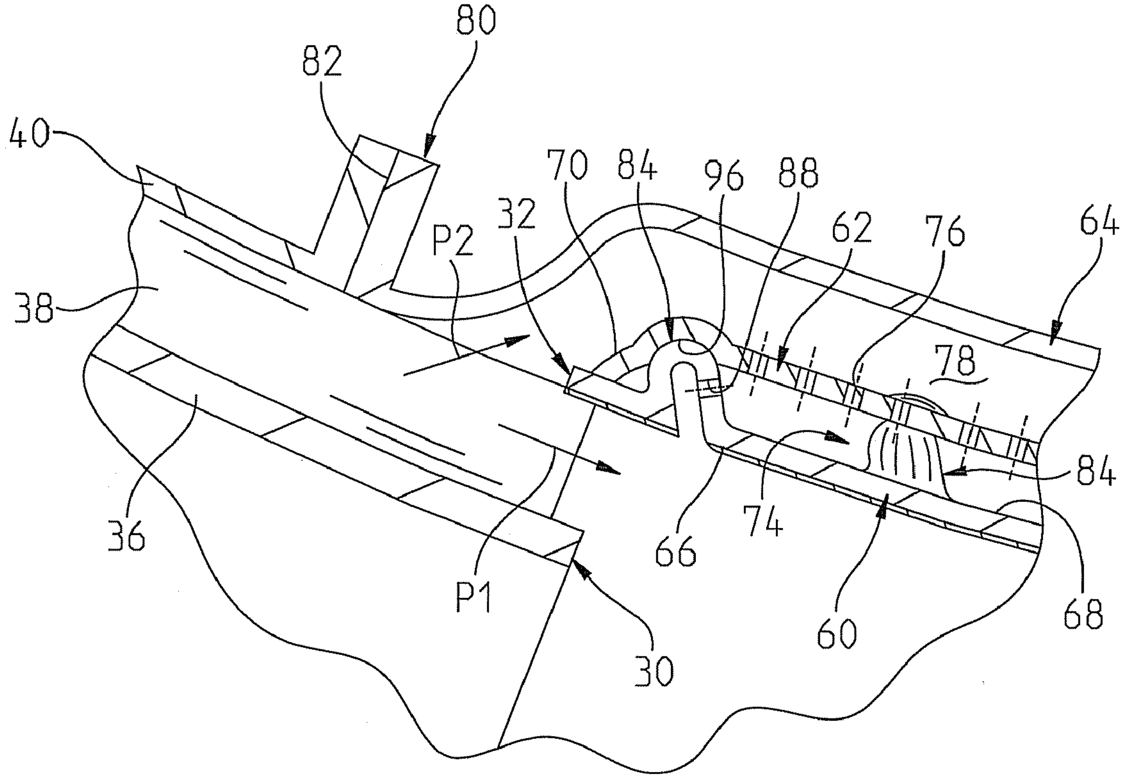
FIG. 4 is an enlarged cross sectional view of an area, identified as area 4 in FIG. 2, illustrating an attachment of a first section of the transition member to a second section of the transition member.

The fins 38 comprise generally axially extending fins 38 that extend radially outwardly from the radially outer surface 44 of the wall member 36. As shown in FIG. 3, the fins 38 are spaced apart to define first section cooling fluid channels 46 between adjacent fins 38. The fins 38 extend substantially from the forward end portion 28 of the first section 24 to the aft end portion 30 of the first section 24, although the wall member 36 extends downstream slightly further than the fins 38, as shown in FIGS. 2 and 4.

Referring to FIG. 2, the external sleeve 40 is disposed about the wall member 36 and the fins 38. An upstream portion 48 of the external sleeve 40 is radially displaced from radially outer edges 54 of the fins 38 such that a gap 50 is formed between the fins 38 and the external sleeve 40. A downstream portion 52 of the external sleeve 40 abuts the radially outer edges 54 of the fins 38. The external sleeve 40 extends substantially from the forward end portion 28 of the first section 24 to the aft end portion 30 of the first section 24, although the wall member 36 and the fins 38 both extend downstream slightly further than the external sleeve 40, see also FIG. 4.

Referring to FIGS. 2 and 3, the upstream portion 48 of the external sleeve 40 includes a plurality of apertures 56 formed therein. The apertures 56 allow an ingress of cooling fluid to flow into the gap 50 as is described further below. The apertures 56 are preferably spaced apart and sized to permit a desired amount of cooling fluid to flow therethrough into the gap 50.

Referring to FIG. 2, the second section 26 comprises an inner assembly 59 and a casing outer wall 64 disposed about the inner assembly 59. The inner assembly 59 includes a casing inner wall 60 and an impingement sleeve or member 62 disposed about the casing inner wall 60 and located in spaced relation to the casing outer wall 64. Referring additionally to FIG. 4, the casing inner wall 60 includes a radially inner surface 66 and an opposed radially outer surface 68. The radially inner surface 66 defines an inner volume $V_2$ of the second section 26 for the flow of the combustion gas, as shown in FIG. 2. The casing inner wall 60 is formed from a high heat tolerant material, such as, for example, an INCONEL alloy (INCONEL is a registered trademark of Special Metals Corporation), although any suitable high heat tolerant material may be used to form the casing inner wall 60. The casing inner wall 60 may comprise a single, unitary piece of material or may be formed from a plurality of pieces of material that are joined together using any suitable method, such as, for example, by bolting or welding. In the embodiment shown in FIG. 2, the casing inner wall 60 extends from the forward end portion 32 of the second section 26 to the aft end portion 34 of the second section 26.

Referring to FIGS. 2 and 4, a forward end 70 of the impingement member 62 is affixed to the radially outer surface 68 of the casing inner wall 60 proximate to the forward end portion 32 of the second section 26. An aft end 72 of the impingement member 62 is affixed to the radially outer surface 68 of the casing inner wall 60 proximate to the aft end portion 34 of the second section 26. The forward and aft ends 70, 72 of the impingement member 62 may be affixed or fastened to the radially outer surface 68 by any conventional means, such as, for example, by welding.

Figure 7:
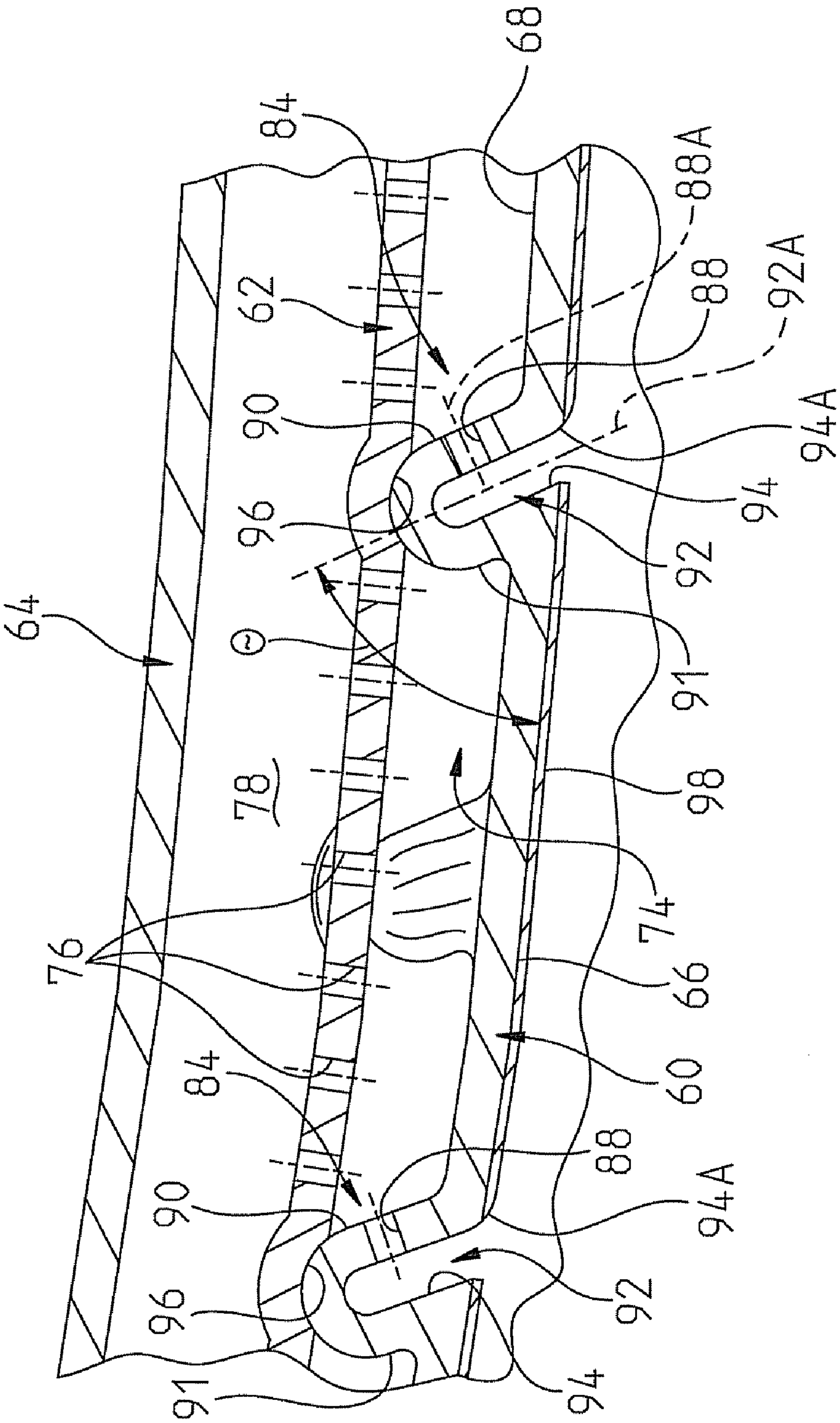
FIG. 7 is an enlarged cross sectional view of an area, identified as area 7 in FIG. 2, illustrating a portion of the second section of the transition member.

Referring to FIGS. 2, 4, and 7, the impingement member 62 is spaced from the radially outer surface 68 of the casing inner wall 60 such that a first IEP cooling fluid channel 74 is formed between the impingement member 62 and the radially outer surface 68 of the casing inner wall 60. The impingement member 62 includes a plurality of apertures 76 formed therein for permitting cooling fluid to flow therethrough into the first IEP cooling fluid channel 74 from a second IEP cooling fluid channel 78 between the impingement member 62 of the inner assembly 59 and the casing outer wall 64 (see FIGS. 4 and 7). The apertures 76 are preferably spaced apart and sized to permit a desired amount of cooling fluid to flow therethrough into the first IEP cooling fluid channel 74.

Referring to FIG. 2, a forward end 80 of the casing outer wall 64 is affixed to the external sleeve 40 of the first section 24 at a casing interface 82 (see FIG. 4), such as with a plurality of casing bolts (not shown). An aft end 82 of the casing outer wall 64 is affixed to the casing inner wall 60 proximate to the aft end portion 34 of the second section 26.

Referring now to FIG. 5, a plurality of spanning members 84 are associated with the radially outer surface 68 of the casing inner wall 60. The spanning members 84 in the illustrated embodiment comprise radially outwardly extending portions of the casing inner wall 60 and are integrally formed with the casing inner wall 60, such as, for example, by a stamping process. However, the spanning members 84 may be formed using any suitable process and may comprise separately formed structures that are affixed to the radially outer surface 68 of the casing inner wall 60.

In the embodiment shown in FIG. 5, the spanning members 84 are provided on radially spaced outer and inner sections 60A and 60B of the casing inner wall 60, and also on first and second side sections 60C and 60D of the casing inner wall 60. However, the spanning members 84 may only be provided on a selected one or ones of the sections 60A, 60B, 60C, 60D. Further, while the spanning members 84 are illustrated in the preferred embodiment as being provided on substantially the entire casing inner wall 60, i.e., from a forward end of the casing inner wall 60 to an aft end of the casing inner wall 60, it is contemplated that only a selected portion or portions of the casing inner wall 60 may include the spanning members 84.

The spanning members 84 in the embodiment shown comprise circumferentially elongate members that are arranged in circumferential rows, wherein circumferentially adjacent spanning members 84 cooperate to form each circumferential row. Further, the spanning members 84 are provided in spaced axially adjacent rows that define a circumferentially displaced, staggered pattern in the embodiment shown. Specifically, the spanning members 84 of each axially adjacent row are provided between the spanning members 84 of the fore and aft axially adjacent rows, i.e., the spanning members 84 of a middle row are provided in gaps 86 formed between the spanning members 84 defining the fore and aft axially adjacent rows. It is contemplated that the spanning members 84 could be provided in other types of arrangements according to other embodiments of the invention, such as, for example, a random pattern.

Figure 6:
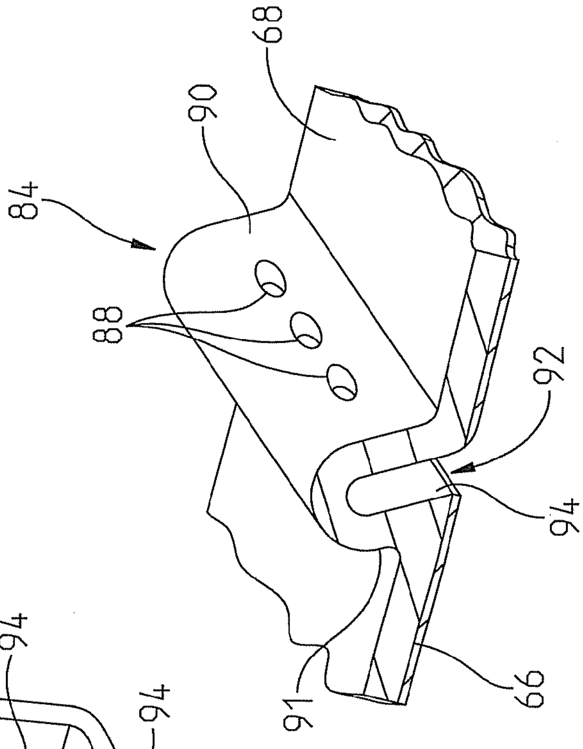
FIG. 6 is an enlarged cut-away perspective view of a spanning member associated with the casing inner wall illustrated in FIG. 5.

Referring to FIG. 6, each spanning member 84 comprises a plurality of apertures 88 formed therein to allow a portion of the cooling fluid located in the first IEP cooling fluid channel 74 to flow therethrough. Preferably, each spanning member 84 comprises between 3 and 5 apertures 88, although any suitable number of apertures 88 may be formed in the spanning members 84. In the embodiment shown, the apertures 88 are formed only in an aft side 90 of the spanning members 84 so as to face away from a direction of flow of the cooling fluid within the first IEP cooling fluid channel 74, which, in FIGS. 2 and 4-7, flows from left to right. However, the apertures 88 may be formed in forward sides 91 of the spanning members 84 instead of or in addition to the aft sides 90 of the spanning members 84. Further, the apertures 88 may be spaced apart and sized to permit a desired amount of cooling fluid to flow therethrough.

Referring now to FIG. 7, each of the spanning members 84 comprises a circumferentially elongate slot 92 formed therein. The slot 92 in each of the spanning members 84 is in fluid communication with the apertures 88 formed in the respective spanning member 84, and also with a respective circumferentially elongate opening 94 or aperture formed in the radially inner surface 66 of the inner casing member 60. It is noted that an aft side 94A (see FIG. 7) of each of the openings 94 defines a smooth transition or rounded surface between the slots 92 and the radial inner surface 66. The rounded aft sides 94A allow cooling air to smoothly transition from the slots 92 to form a film cooling layer along the radially inner surface 66.

As shown in FIG. 7, the slots 92 and their corresponding spanning members 84 each include a component at an angle transverse to the radial direction, i.e., the slots 92 and spanning members 84 are each angled and include a component in the radial direction and a component in the axial direction. In a preferred embodiment, the slots 92 and their corresponding spanning members 84 are formed at an angle θ of about 25° to about 65° relative to the radially inner surface 66 of the inner casing member 60, and angled into the direction of hot gas through the inner volume $V_2$.

Further, the opening 94 of each of the spanning members 84 is displaced, i.e., axially offset, relative to the apertures 88 formed in the respective spanning member 84 such that each opening 94, or a portion thereof, is axially displaced from direct radial alignment with its associated apertures 88. Further, an axis 88A of each of the apertures 88 is oriented transverse to an axis 92A of the respective slot 92 and, as shown in the illustrated embodiment, is substantially perpendicular to the axis 92A.

As shown in FIGS. 4 and 7, the spanning members 84 bridge between the casing inner wall 60 and the impingement member 62. The spanning members 84 in the embodiment shown are received in circumferentially elongate pockets 96 that are formed in the impingement member 62. The pockets 96 in the illustrated embodiment are individually formed to receive one or more corresponding spanning members 84. However, the pockets may define continuous grooves, i.e., extending around the circumference of the impingement member 62 and thus each receiving a circumferential row of the spanning member 84.

Optionally, a thermal barrier coating 98 (hereinafter TBC), such as a thin layer of a ceramic material, may be applied on the radially inner surface 66 of the casing inner wall 60, as shown in FIG. 7. The TBC 98 is applied to provide a thermal barrier for the radially inner surface 66 of the casing inner wall 60 to assist in preventing the casing inner wall 60 from overheating. It is noted that the sizes of the openings 94 in the radially inner surface 66 of the casing inner wall 60 are preferably large enough such that the TBC 98, when applied (and if subsequently re-applied in a re-application procedure), will not seal, i.e., close up, the openings 94. It is also noted that since the apertures 88 formed in each of the spanning members 84 are axially offset from the respective opening 94 of each spanning member 84, the TBC 98 does not substantially enter and/or clog (close off) the apertures 88 when applied/reapplied, i.e., typically in a spray-on application procedure.

During operation of the engine 10, cooling fluid is introduced to the transition member 22 to cool the transition member 22, which, if not cooled, may become overheated by the combustion gas flowing through the inner volumes $V_1$, $V_2$ defined by the first and second sections 24, 26. The cooling fluid may be, for example, bleed or discharge air from the compressor section 14, which cooling fluid is located in an area outside of the external sleeve 40, i.e. in a diffusion chamber 100 (see FIG. 1). The cooling fluid flows from the diffusion chamber 100, through the apertures 56 formed in the external sleeve 40 of the turbine member first section 24, and into the gap 50 formed between the external sleeve 40 and the fins 38. Upon contacting the fins 38, the cooling fluid removes heat from the fins 38 and the wall member 36 via convection cooling. A pressure differential causes the cooling fluid to flow through the first section cooling fluid channels 46 between the adjacent fins 38 (FIG. 3) and exit the aft end portion 30 of the first section 24.

Upon exiting the first section 24 of the transition member 22 and reaching the forward end portion 32 of the second section 26, a first portion of the cooling fluid follows a first flow path $P_1$ (see FIG. 4) and a second portion of the cooling fluid follows a second flow path $P_2$ (see FIG. 4). The portion of the cooling fluid that follows the first flow path $P_1$ forms a film cooling layer that flows along and provides cooling to, i.e., removes heat from, the TBC 98 and the radially inner surface 66 of the casing inner wall 60. It is noted that the film cooling layer is heated by the combustion gas flowing through the inner volume $V_2$ of the casing inner wall 60, and also as a result of removing heat from the TBC 98 and the radially inner surface 66 of the casing inner wall 60. As the film cooling layer is heated it is mixed with the combustion gas and is ultimately conveyed into the turbine section 18 of the engine 10 along with the combustion gas.

The portion of the cooling fluid that follows the second flow path $P_2$ flows into the second IEP cooling fluid channel 78. Portions of the cooling fluid then flow through the apertures 76 formed in the impingement member 62 and into the first IEP cooling fluid channel 74. The cooling fluid in the first IEP cooling fluid channel 74 cools the casing inner wall 60 by removing heat from the radially outer surface 68 of the casing inner wall 60.

Referring to FIGS. 2, 4, and 7, portions of the cooling fluid in the first IEP cooling fluid channel 74 flow through the apertures 88 formed in the spanning members 84 and into the slots 92 of the corresponding spanning members 84, where the cooling fluid provides additional cooling of the casing inner wall 60 by removing heat from the spanning members 84. Thereafter, the cooling fluid flows out of the slots 92 through the openings 94 formed in the radially inner surface 66 of the casing inner wall 60.

Upon exiting the slots 92, the cooling fluid forms a thin film of diffusion cooling air that flows along and provides film cooling to, i.e., removes heat from, the TBC 98 and the radially inner surface 66 of the casing inner wall 60 in a manner similar to that of the portion of the cooling fluid that follows the first flow path $P_1$ as described above. It is noted that smooth transition defined by the aft side 94A of each of the openings 94 is believed to provide a better film layer for film cooling of the TBC 98 and the radially inner surface 66 of the casing inner wall 60. Specifically, since the cooling air is distributed from the slots 92 into the inner volume $V_2$ of the second section 26 along a rounded surface and at an angle of less than 90°, the cooling air is provided with a smooth transition to remain substantially attached to the surface of the TBC 98 as it enters the inner volume $V_2$.

The configuration of the transition member 22 is believed to provide an improved distribution of cooling fluid to the first and second sections 24, 26 and the components thereof. Specifically, the use of cooling fluid to provide convection cooling to the radially outer surface 44 of the wall member 36 of the first section 24 and the radially outer surface 68 of the casing inner wall 60 of the second section 26, and also to provide diffusion cooling to the TBC 98 and the radially inner surface 66 of the casing inner wall member 60 via the thin film of diffusion cooling air, provides a generally balanced cooling design. Further, the double metering of the portion of the cooling fluid that follows the second flow path $P_2$, i.e., the cooling fluid which flows through the apertures 76 in the impingement member 62 and also through the apertures 88 in the spanning member 84, provides a metered flow of the cooling fluid, as controlled by the size and arrangement of the apertures 76, 88.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A transition member between a combustion section and a turbine section in a gas turbine engine, the transition member comprising:

a casing inner wall having a forward end defining a combustion gas inlet downstream of the combustion section and an aft end axially spaced from said forward end and defining a combustion gas outlet upstream of the turbine section, said casing inner wall including a radially inner surface and an opposed radially outer surface, said radially inner surface defining an inner volume of the transition member therein;

an impingement member disposed radially outwardly about said casing inner wall and spaced from said casing inner wall such that a first cooling fluid channel is formed between said impingement member and said casing inner wall, said impingement member including a plurality of apertures formed therein for effecting a passage of cooling fluid from an area radially outward of said impingement member to said first cooling fluid channel; and a plurality of spanning members extending from said radially outer surface of said casing inner wall into a pocket of said impingement member, said spanning members each including a slot formed therein having a component in the radial direction, said slot in communication with a first aperture formed in said radially inner surface of said inner wall and at least one second aperture formed in said spanning member for effecting a passage of said cooling fluid from said first cooling fluid channel to said inner volume defined within said radially inner surface of said casing inner wall.

2. The transition member according to claim 1, wherein at least a portion of said radially inner surface of said casing inner wall is coated with a thermal barrier coating.

3. The transition member according to claim 1, wherein said slot formed in each of said spanning members includes a component at an angle transverse to the radial direction.

4. The transition member according to claim 3, wherein said at least one second aperture is formed in an aft side of its corresponding spanning member.

5. The transition member according to claim 1, wherein said first aperture of each of said spanning members is displaced relative to said at least one second aperture formed in a corresponding one of said spanning members such that said first aperture of each of said spanning members is not radially aligned with its associated at least one second aperture.

6. The transition member according to claim 5, wherein said at least one second aperture of each of said spanning members is axially offset relative to its associated first aperture.

7. The transition member according to claim 1, wherein said spanning members comprise circumferentially elongate spanning members.

8. The transition member according to claim 7, wherein said impingement member includes a plurality of circumferential pockets formed therein, each of said pockets for receiving at least one of said circumferentially elongate spanning members.

9. The transition member according to claim 1, wherein a plurality of circumferentially adjacent spanning members cooperate to define a circumferentially extending row of said spanning members.

10. The transition member according to claim 9, wherein a plurality of said circumferentially extending rows of said spanning members define a plurality of axially spaced rows of said spanning members.

11. The transition member according to claim 10, wherein said spanning members defining a first axially spaced row of said spanning members are circumferentially offset from said spanning members defining an adjacent axially spaced row of said spanning members.

12. The transition member according to claim 1, wherein each of said spanning members comprises between 3 and 5 second apertures formed therein, each of said second apertures associated with a slot of a respective spanning member and its corresponding first aperture.

13. The transition member according to claim 1, wherein said spanning members are integrally formed with said casing inner wall.

14. A transition member between a combustion section and a turbine section in a gas turbine engine, the transition member comprising:

a casing inner wall having a forward end defining a combustion gas inlet downstream of the combustion section and an aft end axially spaced from said forward end and defining a combustion gas outlet upstream of the turbine section, said casing inner wall including a radially inner surface and an opposed radially outer surface, said radially inner surface defining an inner volume of the transition member therein, said radially outer surface in communication with a first cooling fluid channel containing cooling fluid; and a plurality of circumferentially elongate spanning members extending radially outwardly from said radially outer surface of said casing inner wall into a pocket of an impingement member, each said spanning member including a slot formed therein, said slot in communication with a first aperture formed in said radially inner surface of said casing inner wall and a plurality of second apertures formed in said spanning member for effecting a passage of said cooling fluid from said first cooling fluid channel to said inner volume defined within said radially inner surface of said casing inner wall, wherein said slot includes a component in the radial direction and a component in the axial direction such that said first aperture is not radially aligned with said second apertures.

15. The transition member according to claim 14, further comprising the impingement member disposed radially outwardly about said casing inner wall and spaced from said casing inner wall such that said first cooling fluid channel is formed between said impingement member and said casing inner wall, said impingement member including a plurality of apertures formed therein for effecting a passage of said cooling fluid from a second cooling fluid channel comprising an area radially outward of said impingement member to said first cooling fluid channel.

16. The transition member according to claim 15, further comprising a casing outer wall disposed radially outwardly about said impingement member and spaced from said impingement member such that said second cooling fluid channel is formed between said impingement member and said casing outer wall.

17. The transition member according to claim 16, further comprising a first transition member section having a forward end defining a combustion gas inlet for receiving hot combustion gases from the combustion section and an opposed aft end, wherein said casing inner wall, said impingement member, and said casing outer wall define a second transition member section disposed downstream from said first transition member section, a connection of said aft end of said first transition member section to said second transition member section permitting a first portion of said cooling fluid to flow into said second cooling fluid channel and a second portion of said cooling fluid to flow into said inner volume defined by said radially inner surface of said casing inner wall.

18. The transition member according to claim 14, wherein said second apertures of each of said spanning members are axially offset relative to its associated first aperture.

19. The transition member according to claim 14, wherein said second apertures are formed in an aft side of each of said spanning members.

* * * * *